US009155988B2

(12) United States Patent
Sukhman et al.

(10) Patent No.: US 9,155,988 B2
(45) Date of Patent: Oct. 13, 2015

(54) MULTI-STAGE AIR FILTRATION SYSTEMS AND ASSOCIATED APPARATUSES AND METHODS

(71) Applicant: Universal Laser Systems, Inc., Scottsdale, AZ (US)

(72) Inventors: Yefim P. Sukhman, Scottsdale, AZ (US); Joseph T. Hillman, Chandler, AZ (US); Stefano J. Noto, Mesa, AZ (US); Christian J. Risser, Scottsdale, AZ (US); David John Zirbel, Jr., Cave Creek, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 167 days.

(21) Appl. No.: 13/923,152

(22) Filed: Jun. 20, 2013

(65) Prior Publication Data
US 2014/0260989 A1    Sep. 18, 2014

Related U.S. Application Data

(60) Provisional application No. 61/783,719, filed on Mar. 14, 2013.

(51) Int. Cl.
*B01D 53/02* (2006.01)
*B01D 53/04* (2006.01)

(52) U.S. Cl.
CPC ...... *B01D 53/0454* (2013.01); *B01D 2253/102* (2013.01); *B01D 2253/108* (2013.01); *B01D 2253/25* (2013.01); *B01D 2257/708* (2013.01); *B01D 2258/06* (2013.01); *B01D 2259/402* (2013.01); *B01D 2259/41* (2013.01); *B01D 2259/4141* (2013.01); *B01D 2259/4508* (2013.01)

(58) Field of Classification Search
CPC ........ B01D 53/02; B01D 53/04; B01D 53/06; B01D 2253/102; B01D 2253/108
USPC .................... 96/111, 131–133, 150, 151, 429
See application file for complete search history.

(56) References Cited

U.S. PATENT DOCUMENTS 4,787,922 A    11/1988 Kulitz et al.
4,986,836 A    1/1991 Tandon et al.
(Continued)

FOREIGN PATENT DOCUMENTS

JP     62-289222 A  *  12/1987
JP     2000-162387 A  *  6/2000

OTHER PUBLICATIONS

Machine generated English translation of JP 2000-162387 A, published Jun. 2000.*

*Primary Examiner* — Frank Lawrence
(74) *Attorney, Agent, or Firm* — Perkins Coie LLP (57) ABSTRACT

Embodiments of multi-stage air filtration systems are disclosed herein. A filtration system configured in accordance with one embodiment includes at least a first filter and a second filter arranged in series in an exhaust stream. The first filter is arranged to hold a first active media in the exhaust stream, the second filter is arranged to hold a second active media in the exhaust stream, and the active media is selected to remove one or more contaminants known to be in the exhaust stream. The system also includes at least one sensor arranged to detect the presence of the one or more contaminants downstream of the first filter and/or the second filter.

29 Claims, 5 Drawing Sheets

(56) References Cited

U.S. PATENT DOCUMENTS

| | | | |
|---|---|---|---|
| 5,063,035 A * | 11/1991 | Leondaridis et al. | 423/240 R |
| 5,288,306 A * | 2/1994 | Aibe et al. | 95/141 |
| 5,538,540 A * | 7/1996 | Whitlock | 96/111 |
| 5,595,910 A * | 1/1997 | Kant et al. | 435/289.1 |
| 5,685,895 A | 11/1997 | Hagiwara et al. | |
| 6,273,935 B1 * | 8/2001 | Shih et al. | 95/8 |
| 6,454,834 B1 | 9/2002 | Livingstone et al. | |
| 7,419,533 B2 | 9/2008 | Son et al. | |
| 7,828,940 B2 | 11/2010 | Roseberry et al. | |
| 7,857,892 B2 | 12/2010 | Marra et al. | |
| 8,070,863 B2 | 12/2011 | Tsangaris et al. | |
| 8,252,100 B2 | 8/2012 | Worrilow et al. | |
| 2007/0119131 A1 | 5/2007 | Nakano et al. | |
| 2007/0272083 A1 | 11/2007 | Hoge et al. | |
| 2011/0052483 A1 * | 3/2011 | Tabata et al. | 423/581 |
| 2013/0146052 A1 * | 6/2013 | Ding et al. | 128/202.22 |

* cited by examiner

MULTI-STAGE AIR FILTRATION SYSTEMS AND ASSOCIATED APPARATUSES AND METHODS

CROSS-REFERENCE TO RELATED APPLICATION

The present application claims priority to U.S. Provisional Application No. 61/783,719, filed Mar. 14, 2013, which is incorporated herein by reference in its entirety.

TECHNICAL FIELD

The following disclosure relates generally to air filtration systems and, more specifically, to multi-stage air filtration systems with active media, such as activated carbon.

BACKGROUND

Lasers are frequently used for testing, measuring, printing, cutting, marking, medical applications, communications, data transmission, semiconductor processing, and a number of other applications. Many types of lasers have been developed to meet performance criteria for specific applications. For example, engraving, cutting, marking, printing, and many other applications require relatively compact lasers that generate high power outputs and have beams with a desired shape and energy distribution. Such laser-based material processing systems can engrave, mark, cut, weld, or perform other types of surface modifications to materials for a variety of applications.

When the focused laser beam irradiates the surface of a target material (i.e., wood, plastic, leather, coated metals, etc.), the process can create contaminants such as fumes, particulates, smoke, debris, etc. If these contaminants are not evacuated from the material processing site, they can negatively affect and/or damage the optical components and beam delivery components of the laser system. Accordingly, it is beneficial to extract such contaminants from the material processing site. Certain conventional systems vent the contaminants away from the processing area, while other conventional systems filter the contaminants from the air to prevent damage to the system and to prevent exposure to the system operator or other bystanders.

DETAILED DESCRIPTION

The following disclosure describes systems, apparatuses, and methods for multi-stage filtration of contaminated exhaust streams. Certain details are set forth in the following description and in FIGS. 1-3 to provide a thorough understanding of various embodiments of the present technology. Conventional air filtration systems employ mechanical, chemical, and other types of filtration media to filter contaminated exhaust streams. One type of media, active media, has an active surface that adsorbs volatile organic compounds (VOCs), volatile inorganic compounds, and other types of pollutants in an exhaust stream. Active media (e.g., activated carbon) is effective at removing contaminants until the contaminants substantially consume (i.e., saturate) the active media. At this point, the active media has reached "breakthrough," a state at which the active media becomes decreasingly effective at capturing contaminants. In general, the point of breakthrough can depend on the type and number of contaminants in the exhaust stream, the active media volume, exhaust flow rate, etc. Typically, these factors dictate the useful lifetime of the active media (i.e., the amount of time for the active media to reach breakthrough). These factors, however, can be variable and difficult to measure and thus lead to inaccurate estimates of the useful lifetime of a filter. As a result, in some instances the useful lifetime can be either an overestimate or an underestimate. When overestimated, active media may be replaced even though it is not fully consumed. When underestimated, however, the active media is replaced after it is past the point of breakthrough. In the latter case, the active media allows contaminants to exit from the filter and thus the exhaust stream can output those contaminants into the ambient atmosphere. Air filtration systems configured in accordance with embodiments of the present technology, however, address these and other limitations of conventional air filtration systems.

In one embodiment of the present technology, a filtration system includes first active media at an upstream filter, second active media at a downstream filter, and at least one sensor downstream from the first and/or second active media. The first active media can adsorb contaminants not captured by particulate filters (e.g., VOCs, volatile inorganic compounds, etc.). The second active media adsorbs contaminants that escape from or are otherwise not adsorbed at the first active media. In selected embodiments, the filtration system can include multiple sensors. For example, the system can include one or more additional sensors that are upstream and/or downstream from both the first and second active media. In one aspect of these embodiments, at least one sensor detects contaminant concentration to identify when the first active media should be replaced. One advantage of this arrangement is that the first active media can remain in the exhaust stream beyond the point of breakthrough to extend the useful lifetime of the first filter. Another advantage is that the first media can be fully consumed and thus used to its full capacity. Yet another advantage is that the second active media captures contaminants that escape from the first active media (such as after breakthrough at the first active media) to ensure that contaminants do not exit into the ambient or atmosphere. A further advantage is that the second media can also be used to its full capacity. In particular, once it is determined that the first active media has reached full capacity, the first active media can be replaced with the (substantially unconsumed) second active media. For example, the second active media can be moved upstream and new active media can be placed downstream.

Figure 1:
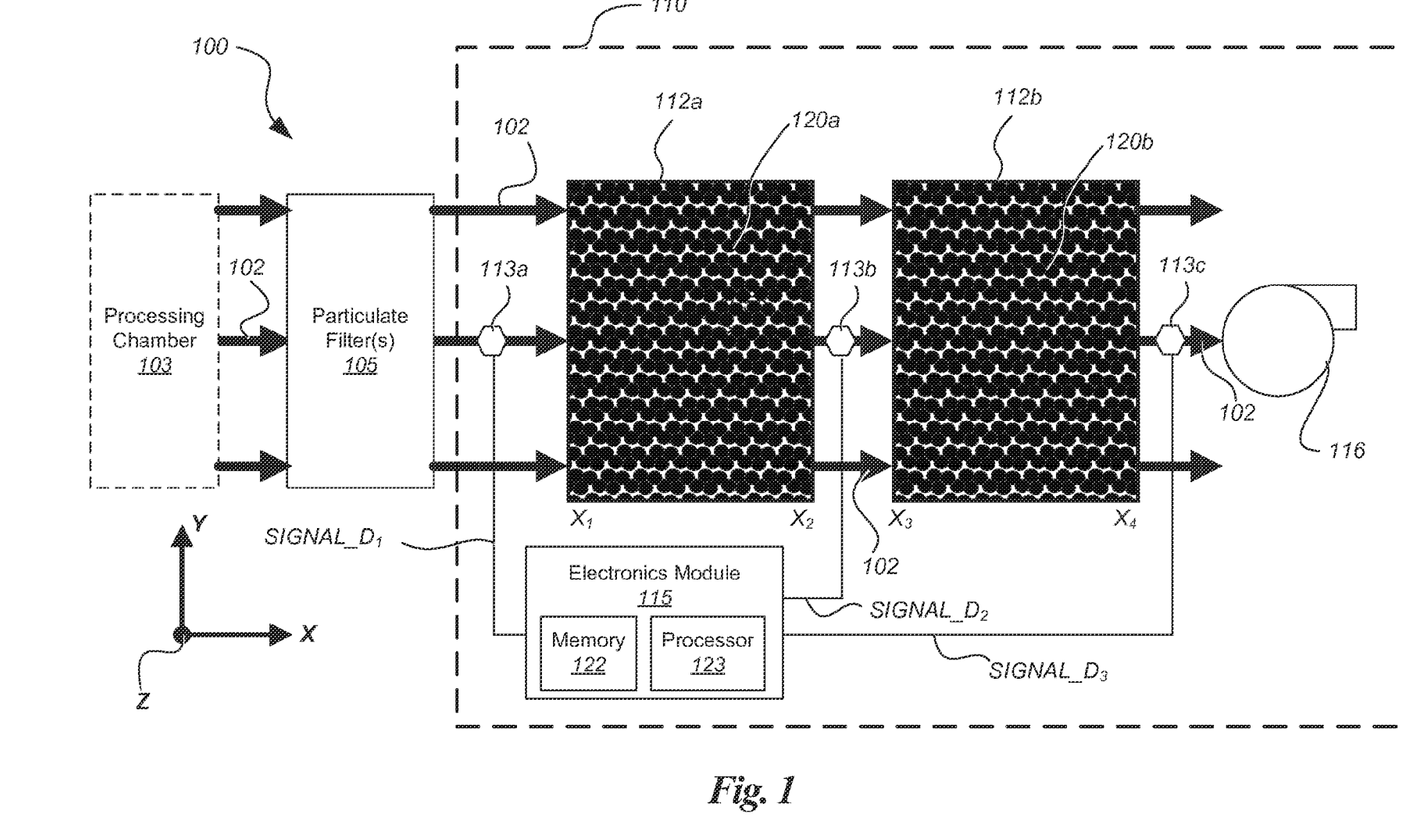
FIG. 1 is a schematic plan view of an air filtration system configured in accordance with an embodiment of the present technology.

FIG. 1 is a schematic plan view of a multi-stage filtration system 100 configured in accordance with an embodiment of the present technology. The filtration system 100 is arranged within a flow path of an exhaust stream 102. The exhaust stream 102 can be vented from a material processing chamber 103 or other exhaust source, such as the exhaust of a building, laboratory, laboratory equipment, manufacturing facility, or other suitable exhaust source. The processing chamber 103 can at least partially house one or more assemblies or tools for processing various target materials (e.g., wood, plastic, leather, coated materials, etc.). Such processing can include, for example, welding, soldering, printing, plasma cutting, sintering, or other processes that produce fumes, particulates, smoke, debris, and other forms of contaminants.

In the illustrated embodiment, the filtration system 100 includes one or more particulate filters 105 (e.g., one or more stages of HEPA filters) and a filtration assembly 110 in the flow path of the exhaust stream 102. The filtration assembly 110 includes first and second active media filters 112a-b, first through third sensors 113a-c, an electronics module 115, and an air handler 116 (e.g., a blower, fan, etc.). For purposes of illustration, other components of the system 100 are absent (e.g., dampers, heaters, louvers, ductwork, piping, etc.).

In some embodiments, the filtration assembly 110 further includes an enclosure (not shown) that commonly houses the filters 112, the sensors 113, the electronics module 115, and/or the air handler 116. As such, the filtration assembly 110 can be a pre-assembled and/or standalone unit. In other embodiments, however, the filtration assembly 110 and/or the components of the filtration assembly 110 are implemented differently. For example, the filters 112, the sensors 113, the electronics module 115, etc. can be independently installed or retrofitted into a system.

The filters 112 are in series and within the flow path of the exhaust stream 102. The filters 112 each hold (or contain), respectively, a volume of first and second active media 120a-b. In particular, the first filter 112a has a volume defined by a first surface area (not visible in FIG. 1) in the Y-Z plane and the distance between first and second X-axis locations $X_1$ and $X_2$. The second filter 112b has a second volume defined by a second surface area (also not visible in FIG. 1) in the Y-Z plane and the distance between third and fourth X-axis locations $X_3$ and $X_4$. In the illustrated embodiment, the volumes of the filters 112 are the same. In other embodiments, however, the volumes can be different than one another.

In general, the active media 120 can be selected according to the type of contaminates to be adsorbed or otherwise filtered. For example, the active media 120 can include activated carbon, zeolite, and/or other suitable materials. In some embodiments, the active media 120 can include at least two different active media materials within the same filter. In other embodiments, the active media 120 can include additives, such as iodine or sulfur, to facilitate adsorption.

The sensors 113 are adjacent to and/or within the flow path of the exhaust stream 102. In the illustrated embodiment, the first sensor 113a is upstream from the filters 112, the second sensor 113b is between the filters 112, and the third sensor 113c is downstream from the filters 112. In general, the individual sensors 113 can include an electrical, optical, or other suitable detector element that responds to changes in contaminant concentration (or the presence of one or more particular contaminants) in the exhaust stream 102 by changing the output resistance, current, voltage, etc. of a sensor. In one embodiment, the individual sensors 113 include gas sensors (e.g., part type TGS2442) from Figaro USA, Inc. of 121 S. Wilke Rd., Arlington Heights, Ill., 60005.

In some embodiments, one or more additional sensors can be adjacent to, within, and/or outside of the exhaust stream 102. In one embodiment, multiple sensors can be co-located. For example, the co-located sensors can detect for different contaminants and/or different contaminant concentrations. In another embodiment, one sensor can detect for one or more types of contaminates that can be adsorbed by the active media 120, while another sensor can detect for contaminants that are not adsorbed by the active media 120 (e.g., carbon monoxide).

The electronics module 115 is electrically coupled to the sensors 113. In the illustrated embodiment, the electronics module 115 includes a memory 122 and a processor 123 (e.g., a controller, logic circuit, general computer, etc.) configured to execute processor-readable instructions stored in the memory 122. In one embodiment, the memory 122 includes a datastore (e.g., a database) of processing parameters, calibration information, user preferences, etc. In another embodiment, the electronics module 115 is a software and/or hardware component of a larger system, such as a material processing station. For example, a system controller can process signals from the sensors 113 and also control processing parameters at the processing chamber 103 (e.g., processing speed, power, time, temperature, etc.). Because the basic structures and functions related to processors, processor-readable instructions, and related implementations are known, they have not been shown or described in detail here to avoid unnecessarily obscuring the described embodiments. In other embodiments, the electronics module 115 does not include a processor or memory. For example, the electronics module 115 can include one or more light emitting diodes (LEDs) directly coupled with one or more of the sensors 113 to illuminate or change color based on the output (e.g., voltage) of the sensors 113.

In operation, the air handler 116 supplies air flow (e.g., laminar air flow) to draw the exhaust stream 102 through the particulate filters 105 and the filters 112. At a pre-filter stage, the particulate filters 105 remove particulates (e.g., ablated material, debris, etc.) from the exhaust stream 102. At a first stage between x-axis locations $X_1$, $X_2$, the first filter 112a adsorbs contaminates not captured by the particulate filters 105. At a second stage between x-axis locations $X_3$, $X_4$, the second filter 112b adsorbs contaminates not captured by the first filter 112a. As described in greater detail below, the second filter 112b generally does not adsorb contaminants until the first filter 112a is at or near breakthrough.

The first sensor 113a outputs a first signal $D_1$ based on the contaminate concentration it detects upstream from the first filter 112a (i.e., upstream from x-axis location $X_1$). The second sensor 113b outputs a second signal $D_2$ based on the contaminate concentration it detects downstream from the first filter 112a, but upstream from the second filter 112b (i.e., between x-axis locations $X_2$, $X_3$). The third sensor 113c outputs a third signal $D_3$ based on the contaminate concentration it detects downstream from the second filter 112b (i.e., downstream from x-axis location $X_4$). In one aspect of this embodiment, the sensors 113 can detect the presence of one or more types of contaminants known (or expected) to be in the exhaust stream 102. In select embodiments, the sensors 113 can measure an amount of contaminant concentration but do not discriminate between different types of contaminates present in the exhaust stream 102. For example, the sensors 113 can measure the concentration of an ensemble of different types of contaminants, but do not identify the particular contaminants within the ensemble. In some embodiments, the individual sensors 113 are calibrated to measure for certain threshold amounts of contaminate concentration. For example, a high voltage signal, e.g., 5 V, can indicate no contaminants (or a negligible amount) of contaminants, while a low voltage signal, e.g., 0 V, can indicate a threshold concentration (or significant amount) of contaminants. In other embodiments, the sensors can be re-calibrated, such as when different contaminants are expected to be present in the exhaust stream 102.

The electronics module 115 receives or interprets the sensor signals $D_1$-$D_3$ to output status information. The status information, for example, can indicate remaining filter lifetime, whether a filter is at breakthrough, and/or whether a filter should be replaced. In one embodiment, the electronics module 115 produces status information by comparing one or more of the signals $D_1$-$D_3$ to a pre-set value stored, e.g., in the memory 122. In another embodiment, the electronics module 115 produces status information by comparing two or more of the sensor signals $D_1$-$D_3$ to one another. In some embodiments, the electronics module 115 transmits information for display at a display device (not shown), such as a monitor, a panel of light emitting diodes (LEDs), etc. The displayed information can include, for example, a numerical value, a graphical icon, an illuminated LED, etc. In other embodiments, the electronics module 115 transmits signals to a speaker to sound an audible alarm based on the status information. In still further embodiments, the electronics module 115 can receive user input from one or more input devices (not shown) to control processing parameters, calibrate sensors, access system information, etc. User input devices can include, for example, a keypad, touchscreen, buttons, toggle switches, knobs, or other suitable local devices or remote devices (connected, e.g., via a computer network).

FIGS. 2A-2F are diagrams that show the filters 112 in various stages of operation in accordance with an embodiment of the present technology. In particular, FIGS. 2A-2F show the active media 120 at various states of consumption. In the illustrated embodiment, whitened circles represent consumed portions of the active media 120 and darkened circles represent unconsumed portions of the active media 120. For purposes of illustration, the sensors 113 are shown to output 5.0 V when the detected contaminate concentration is negligible and 0.8 V when the detected contamination concentration is at or above a threshold level. In other embodiments, however, other signal types and/or values are contemplated.

At a first time $t_1$ (FIG. 2A), the exhaust stream 102 begins to flow through the filters 112. Upon detecting a significant contaminant concentration in the exhaust stream 102, the first sensor 113a outputs 0.8 V. The second sensor 113b, however, does not detect a significant contaminant concentration because it is downstream from the (unconsumed) active media of the first filter 112a. Accordingly, the second sensor 113b outputs 5.0V. Similarly, the third sensor 113c, also downstream from the first filter 112a, does not detect a significant contaminant concentration, so it outputs 5.0 V.

Figure 2A:
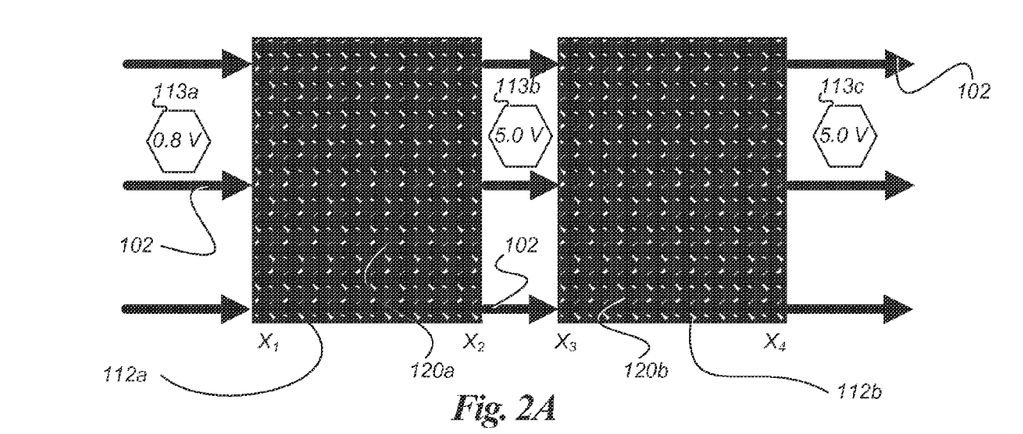
FIGS. 2A-2F are diagrams that show air filters in various stages of operation in accordance with an embodiment of the present technology.

In some embodiments, the third sensor 113c can provide a safety measure to prevent contaminants from exhausting into the ambient or atmosphere. For example, contaminants may enter the ambient if previously used filters (i.e., fully or partially consumed filters) are inadvertently installed. Accordingly, in the illustrated embodiment, if the output voltage of the third sensor 113c changes from 5.0V, this can indicate that the system should be shut down to inspect or replace the filters 112.

At a second time $t_2$ after time $t_1$ (FIG. 2B), the contaminants in the exhaust stream 102 have consumed a portion of the active media of the first filter 112a. As shown, the consumption can be non-uniform due to, e.g., non-uniform and/or turbulent exhaust flow. In the illustrated embodiment, the first sensor 113a continues to detect a significant contaminant concentration and thus continues to output 5.0 V. However, if the contamination concentration was to decrease (i.e., below the threshold level of contaminant concentration), the first sensor 113a may produce a different voltage that is greater than 0.8 V.

Figure 2B:
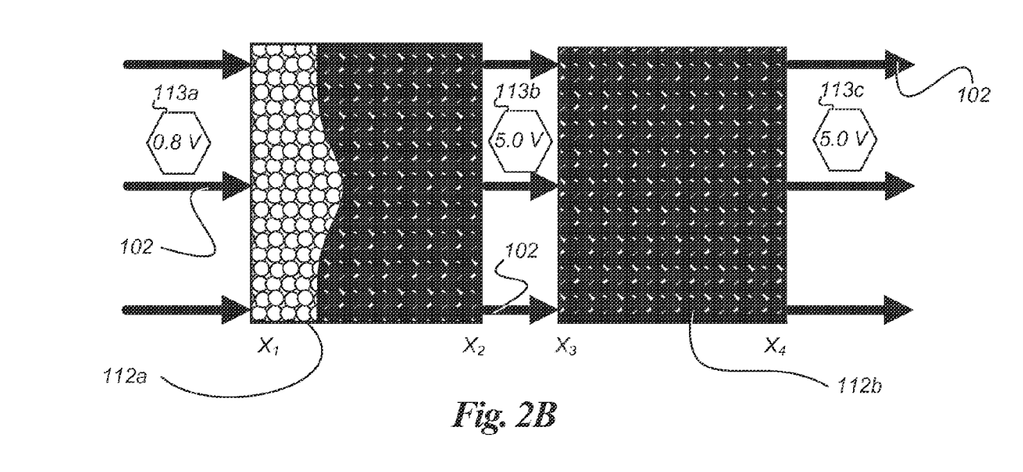
Figure 2C:
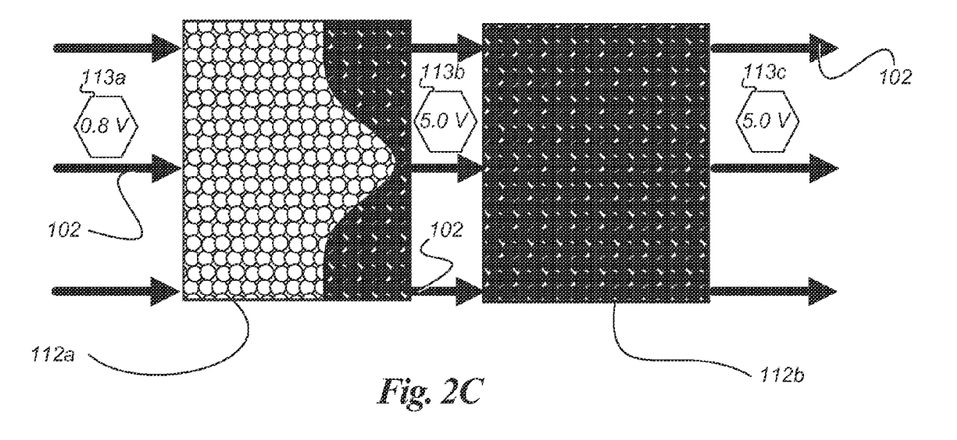

Also at time $t_2$, the contaminants of the exhaust stream 102 have not consumed the active media of the second filter 112b. In particular, this is because the active media of the first filter 112a has not reached breakthrough. Accordingly, the first filter 112a shields the active media of the second filter 112b from contaminants. As a result, the voltages of the second and third sensors 113b-c do not change.

At a third time $t_3$ after time $t_2$ (FIG. 2C), the contaminants of the exhaust stream 102 have consumed a further portion of the active media of the first filter 112a, but the media has yet to reach breakthrough. Accordingly, the first filter 112a continues to shield the active media of the second filter 112b from contaminants and the voltages of the sensors 113 remain unchanged.

At a fourth time $t_4$ after time $t_3$ (FIG. 2D), the exhaust stream 102 has consumed the active media of the first filter 112a past the point of breakthrough. As a result, the first filter 112a does not fully shield the active media of the second filter 112b from contaminants. Thus, the contaminants of the exhaust stream 102 have begun to consume the active media of the second filter 112b. However, because the first filter 112a still contains unconsumed media, the first filter 112a at least partially shields the active media of the second filter 112b from contaminants.

Figure 2D:
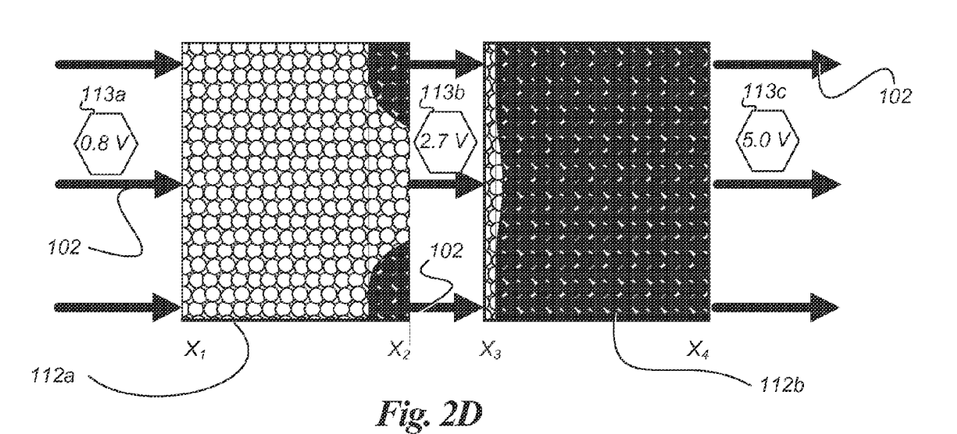

Also at time $t_4$, the output voltage of the second sensor 113b decreases to 2.7 V in response to detecting contaminants between the locations $X_2$ and $X_3$. The voltage of the second sensor 113b is larger than the voltage of the first sensor 113a because the contaminate concentration between x-axis locations $X_1$, $X_2$ is smaller than the concentration upstream from the first filter 112a. In particular, the concentration between x-axis locations $X_1$, $X_2$ is smaller because the first filter 112a partially shields the second sensor 113b from contaminants. In one embodiment described in greater detail below, the electronics module 115 (FIG. 1) can detect breakthrough when the output of the second sensor 113b changes (e.g., decreases from 5.0 V).

At a fifth time $t_5$ after time $t_4$ (FIG. 2E), the contaminants in the exhaust stream 102 have fully consumed the active media of the first filter 112a. As a result, the first filter 12a no longer shields the active media of the second filter 112b from contaminants. Accordingly, the contaminants in the exhaust stream 102 can consume the active media of the second filter 112b at a faster rate.

Figure 2E:
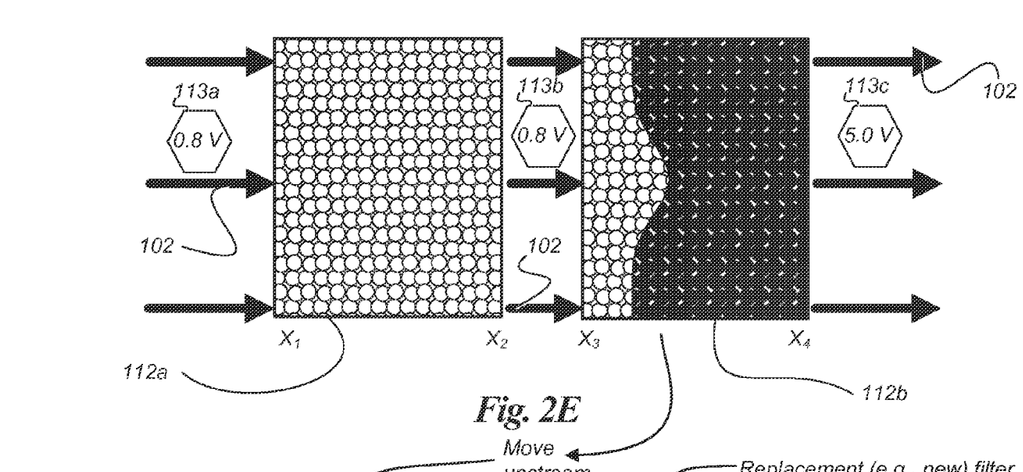

Also at time $t_5$, the output voltage of the second sensor 113b decreases to 0.8 V in response to the second sensor 113b detecting a larger contaminate concentration between the locations $X_2$ and $X_3$. In one embodiment described in greater detail below, the electronics module 115 can detect that the first filter 112a is fully consumed when the output voltages of the first and second sensors 113a, 113b are substantially the same.

At a sixth time $t_6$ after time $t_5$ (FIG. 2F), the first filter 112a has been removed from the system 100 and replaced by the second filter 112b. In the illustrated embodiment, the second filter 112b is moved upstream from the second sensor 113b and a new filter 212c is placed downstream from the second sensor 113b. In this arrangement, the remaining unconsumed media of the second filter 112b is positioned to shield the active media of the new filter 212c. As a result, the output voltage of the (now shielded) second sensor 113b increases to 5.0 V. The output voltage of the third sensor 113c likewise remains at 5.0 V. In other embodiments described in greater detail below, the first filter 112a can be replaced before time $t_6$. For example, the first filter 112a can be replaced after breakthrough but before it is fully consumed.

Figure 2F:
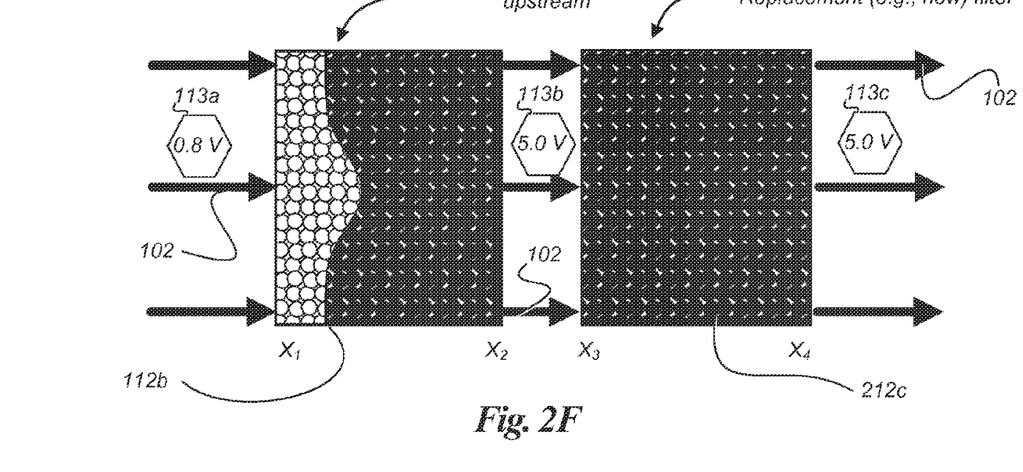

At a later time after time $t_6$, the above-described stages can be repeated with the second filter 112b and the new filter 212c. For example, when contaminants have fully consumed the second filter 112b, it can be removed and replaced with the new filter 212c and another new filter can be placed downstream from the second sensor 113b.

Figure 3:
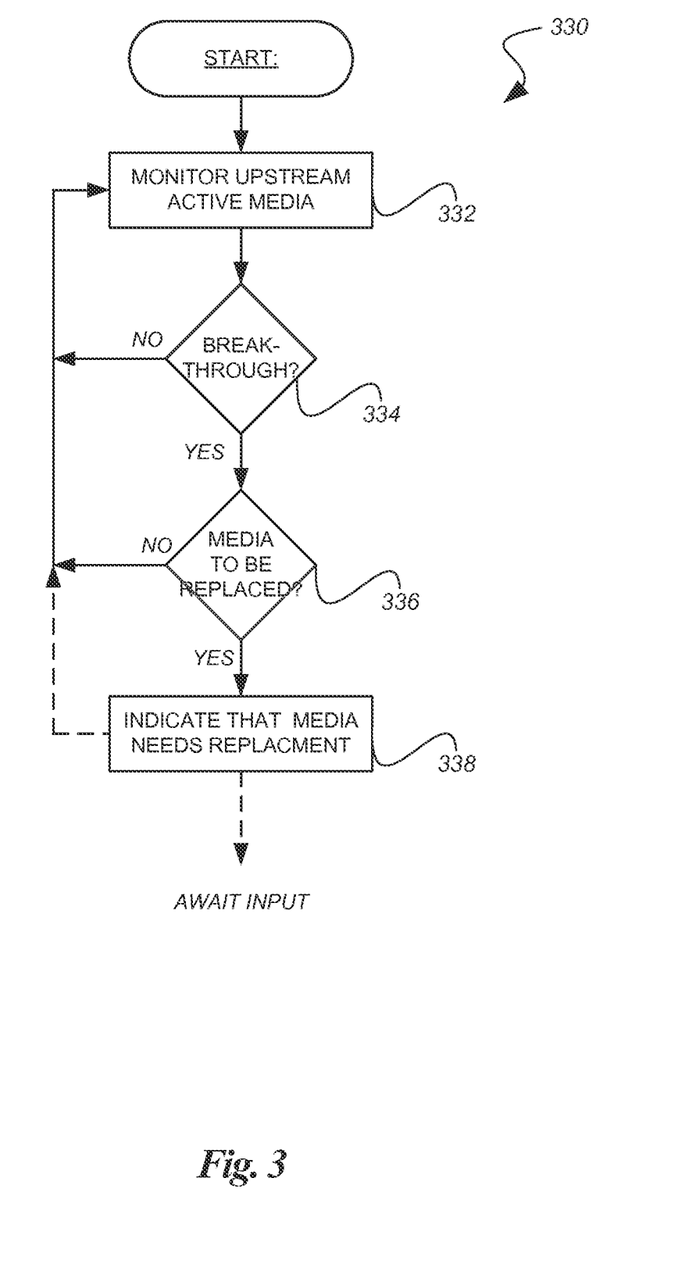
FIG. 3 is a flow diagram illustrating a routine that can be carried out by an air filtration system in accordance with an embodiment of the present technology.

FIG. 3 is a flow diagram illustrating a routine 330 that can be carried out by an air filtration system in accordance with an embodiment of the present technology. In one aspect of this embodiment, the routine 330 is carried out by the electronics module 115 (FIG. 1). After a start block (e.g., after system power on, upon initiation of exhaust flow, etc.), the routine 330 proceeds to block 332 to monitor upstream active media in an exhaust stream via one or more sensors adjacent to and/or within in the exhaust stream. In one embodiment, the routine 330 monitors the upstream media using a single sensor between the upstream media and downstream media. For example, the routine 330 can monitor a system in which the first and third sensors 113a, 113c (FIG. 1) are absent. Alternately, the routine 330 can monitor both upstream and downstream active media with two or more sensors. For example, the routine 330 can monitor the first active media 120a (FIG. 1) with the first and second sensors 113a-b and the second active media 120b with the second and third sensors 113b-c. In other embodiments, the routine 330 can monitor multiple stages of active media, such as a system that includes three or more stages of active media air filters.

In one aspect of this embodiment, the routine 330 can monitor the active media based on the known contaminants in the exhaust stream. For example, in material processing systems, the known contaminants can be those typically produced by certain materials (e.g., particular types of plastics, woods, metals, etc.). In some embodiments, a user can identify which materials are known to be in the exhaust stream. For example, the electronics module 115 can store a library of materials and corresponding configuration states (e.g., sensor calibrations, threshold contamination concentrations, projected filter lifetime, etc.). When the user selects one or more particular materials from the library, the electronics module 115 can load the appropriate configuration state. In select embodiments, a configuration state can be based on various emission and/or occupational safety standards set forth by a local, state, and/or other governmental agency.

In another aspect of this embodiment, the routine 330 can provide dynamic feedback to a system controller. For example, in a laser processing system, the routine 330 can reduce processing speed or output power in response to detecting a large contaminant concentration. Alternately, the routine 330 can shut down or suspend processing in response to detecting a large contaminant concentration. Upon detecting a decrease in the concentration, however, the routine 330 can reset or restore the maximum processing speed. In some embodiments, the routine 330 provides dynamic feedback once it detects that a filter is at or beyond breakthrough.

At decision block 334, the routine 330 determines whether breakthrough has occurred at the upstream media. In one embodiment, the routine 330 can detect breakthrough by sensing for any change in the output signal of a single sensor in the exhaust stream. For example, the routine 330 can detect breakthrough at the first filter 112a by sensing for a change in the output signal of the second sensor 113b (FIG. 1). In another embodiment, the routine 330 detects for breakthrough by comparing the output signals of multiple sensors in the exhaust stream.

If the routine 330 does not detect breakthrough, the routine returns to block 332 to continue monitoring the upstream media. If, however, the routine 330 detects breakthrough, the routine 330 proceed to decision block 336 to determine whether the upstream media should be replaced.

At decision block 336, the routine 330 determines whether the upstream media should be replaced. In one embodiment, the upstream media can be replaced based on whether a predetermined amount of time has elapsed since detecting breakthrough. The predetermined time can be based on, for example, the known contaminants in the exhaust stream, a predetermined model representative of filter consumption, and/or historical data. In another embodiment, the routine 330 determines whether to replace the upstream media by comparing the output signal from a sensor upstream from the media to a signal from a sensor downstream from the media. In some embodiments, the filter is to be replaced when the upstream and downstream sensors are at the same signal level. As discussed above, when at the same signal level, the sensors can indicate that the upstream media is fully consumed.

If the upstream media is not to be replaced, the routine returns to block 332 to continue monitoring the upstream media. For example, the routine 332 may wait until the upstream media is fully consumed before it is to be replaced. If, however, the upstream media is to be replaced, the routine 330 proceeds to block 338.

At block 338, the routine 330 can output an alert, system prompt, or other indication that at least the upstream media needs replacement. In one embodiment, the indication may include a general alert, such as a visual and/or audible alarm. In another embodiment, the routine 330 may shut down the exhaust source when the upstream media is to be replaced. In such embodiments, the routine 330 may interlock the exhaust source until the routine 330 receives an indication that the upstream media has been replaced. For example, the routine 330 may prompt a user to input a confirmation that the upstream media has been replaced. Once the upstream media has been replaced, the routine 330 can automatically return to block 332 to monitor the replacement media. Alternately, the routine 330 can await input (or further input).

From the foregoing, it will be appreciated that specific embodiments of the disclosure have been described herein for purposes of illustration, but that various modifications may be made without deviating from the spirit and scope of the various embodiments of the disclosure. In some embodiments, filtration assemblies and/or systems can be scaled by adding additional active media filter stages within an exhaust stream. For example, filtration assemblies and/or systems can include three or more active media filter stages. Such additional stages can include, for example, sensors at one or both ends of individual filters, sensors alternatingly positioned between filters, etc. For example, although many of features of the system are described above with reference to singular components illustrated schematically in FIG. 1, in other embodiments the system can include multiple components (e.g., multiple filters, air movers, etc.). Further, while various advantages associated with certain embodiments of the disclosure have been described above in the context of those embodiments, other embodiments may also exhibit such advantages, and not all embodiments need necessarily exhibit such advantages to fall within the scope of the disclosure.

We claim:

1. A filtration system, comprising:
    at least a first filter and a second filter arranged in series in an exhaust stream, wherein
        the first filter includes a first active media and is arranged to hold the first active media in the exhaust stream, and
        the second filter includes a second active media and is arranged to hold the second active media in the exhaust stream;
    at least one sensor arranged to detect a presence of one or more contaminants downstream of the first filter and/or the second filter, wherein the at least one sensor includes at least one first sensor arranged to detect at least a first type of contaminant; and at least one second sensor arranged to detect at least a second type of contaminant that is different than the first type of contaminant; and wherein the first and second active media is selected to remove the one or more contaminants known to be in the exhaust stream.

2. The system of claim 1, further comprising electronics operably coupled to the at least one sensor and configured to interpret a reading from the at least one sensor based at least in part on the one or more contaminants known to be present in the exhaust stream.

3. The system of claim 2 wherein the electronics are further configured to receive user input identifying the one or more contaminants known to be present in the exhaust stream.

4. The system of claim 2 wherein the electronics are further configured to present to a user a number of configuration states that are user-selectable, and wherein the configuration states are associated with the one or more contaminants known to be present in the exhaust stream.

5. The system of claim 1, further comprising electronics operably coupled to the at least one sensor, wherein the electronics are configured to identify an amount of time that the first and/or the second filter should remain in the exhaust stream after sensing the presence of the one or more contaminants downstream of the first and/or the second filter, wherein the amount of time is based, at least in part, on a predetermined model representative of filter consumption of the first filter and/or the second filter.

6. The system of claim 1 wherein the first active media and/or the second active media includes activated carbon.

7. The system of claim 1 wherein the first active media and/or the second active media includes a zeolite material.

8. The system of claim 1 wherein the first active media and/or the second active media includes at least one additive to facilitate adsorption.

9. The system of claim 1 wherein the first active media and/or the second active media includes at least two different active media materials.

10. The system of claim 1 wherein:
the first active media includes a first volume of the first active media;
the second active media includes a second volume of the second active media; and
the first volume is substantially the same as the second volume.

11. The system of claim 1 wherein:
the first media includes a first volume of the first active media;
the second media includes a second volume of the second active media; and
the first volume is different than the second volume.

12. A filtration system, comprising:
at least a first filter and a second filter arranged in series in an exhaust stream, wherein
the first filter includes a first active media that it is configured to hold in the exhaust stream, and
the second filter includes a second active media that it is configured to hold in the exhaust stream;
at least one sensor arranged to detect a presence of one or more contaminants downstream of the first filter and/or the second filter, wherein the at least one sensor includes at least one first sensor arranged to detect at least a first type of contaminant; and at least one second sensor arranged to detect at least a second type of contaminant that is different than the first type of contaminant and not removed from the exhaust steam by the active media, wherein the first and second active media is selected to remove the one or more contaminants known to be in the exhaust stream.

13. The system of claim 12 wherein the at least one second sensor is arranged to detect carbon monoxide.

14. The system of claim 12 wherein the system further comprises:
material processing equipment; and
electronics operably coupled to the at least one second sensor, wherein the electronics is configured to:
output an alarm based at least in part on a concentration of the second type of contaminant detected by the at least one second sensor, and/or
halt material processing based at least in part on the concentration of the second type of contaminant detected by the at least one second sensor.

15. The system of claim 12 wherein the system further comprises:
material processing equipment; and
first electronics operably coupled to the at least one second sensor, and in communication with second electronics in the material processing equipment to adjust a processing parameter of the material processing equipment based, at least in part, on a concentration of the second type of contaminant detected by the at least one second sensor.

16. The system of claim 15 wherein the processing parameter includes a processing speed of the material processing equipment.

17. The system of claim 15 wherein the processing parameter includes a processing power of the material processing equipment.

18. The system of claim 1 wherein the first filter is upstream from the second filter.

19. The system of claim 18 wherein the at least one sensor is disposed between the first and second filters.

20. The system of claim 18 wherein the at least one sensor is downstream from the first and second filters.

21. The system of claim 18 wherein the at least one sensor includes:
a first sensor upstream from the first and second filters; and
a second sensor disposed between the first and second filters.

22. The A filtration system, comprising:
at least a first filter and a second filter arranged in series in an exhaust stream, wherein
the first filter is configured to hold a first active media in the exhaust stream;
the second filter is configured to hold a second active media in the exhaust stream; and
at least one sensor arranged to detect a presence of one or more contaminants downstream of the first filter and/or the second filter, wherein the at least one sensor includes a first sensor upstream from the first and second filters, and a second sensor disposed between the first and second filters,
wherein
the first and second active media is selected to remove the one or more contaminants known to be in the exhaust stream,
the first sensor is configured to output a first signal indicative of a first concentration of contaminants in the exhaust stream, and the second sensor is configured to output a second signal indicative of a second concentration of contaminants in the exhaust stream, the system further comprises electronics operably coupled to the first and second sensors, and wherein the electronics are configured to compare the first signal with the second signal, and based on the comparison of the first signal with the second signal, provide at least a third signal indicating that the first active media has been substantially consumed.

23. The system of claim 22 wherein the electronics are further configured to indicate to a user, based on the third signal, that:

the first filter is to be removed from the exhaust stream;

the second filter is to be moved upstream from the second sensor; and a third filter having a third active media is to be placed in the exhaust stream downstream from the second sensor, wherein the third active media is less consumed than the second active media.

24. The system of claim 18 wherein the at least one sensor includes:

a first sensor disposed between the first and second filters; and a second sensor downstream from the first and second filters.

25. The system of claim 18 wherein the at least one sensor includes:

a first sensor upstream from the first filter;

a second sensor disposed between the first and second filters; and a third sensor downstream from the first and second filters.

26. The system of claim 1, further comprising additional filters arranged in series in the exhaust stream with the first and second filters, wherein the additional filters are arranged to hold additional active media.

27. The system of claim 22, wherein the electronics are further configured to interpret a reading from the at least one sensor based at least in part on the one or more contaminants known to be present in the exhaust stream.

28. The system of claim 22 wherein the electronics are further configured to receive user input identifying the one or more contaminants known to be present in the exhaust stream.

29. The system of claim 22 wherein the electronics are further configured to present to a user a number of configuration states that are user-selectable, and wherein the configuration states are associated with the one or more contaminants known to be present in the exhaust stream.

* * * * *